United States Patent Office
3,242,434
Patented Mar. 22, 1966

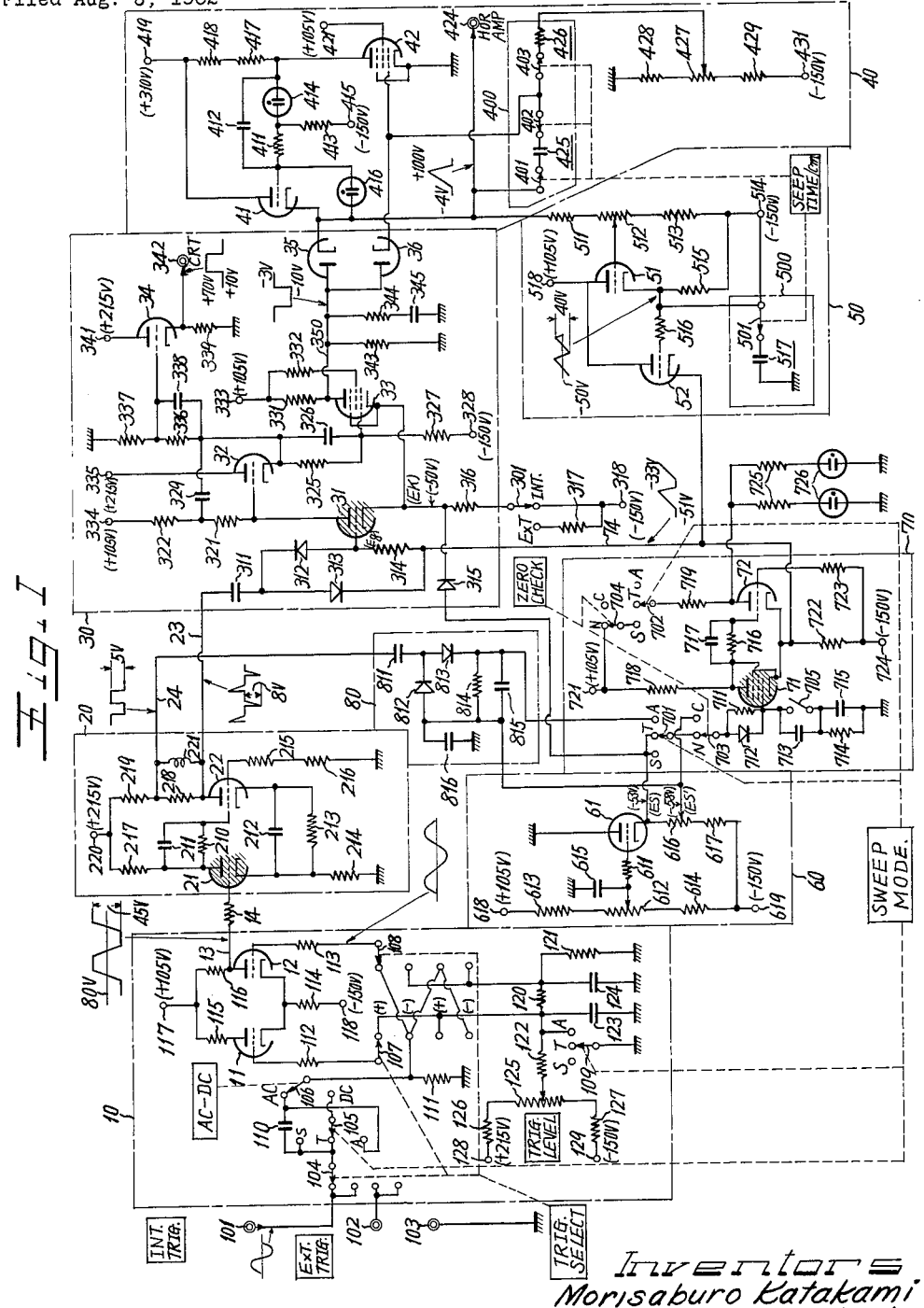

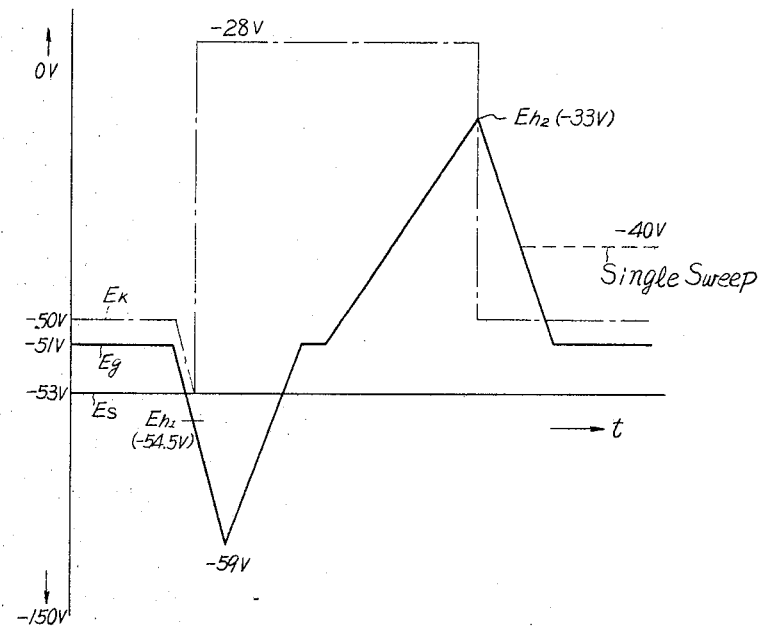

3,242,434
TRIGGER SWEEP CIRCUIT OF A CATHODE-RAY OSCILLOSCOPE
Morisaburo Katakami and Masahide Nishida, Tokyo, Japan, assignors to Kabushikikaisha Yokogawa Denki Seisakusho (Yokogawa Electric Works Ltd.), Tokyo, Japan, a corporation of Japan
Filed Aug. 8, 1962, Ser. No. 215,611
Claims priority, application Japan, Aug. 15, 1961, 36/29,566
9 Claims. (Cl. 328—181)

This invention relates to improvements of a cathode-ray oscilloscope, and more particularly to improvements of an oscilloscope using a trigger sweep circuit.

In accordance with this invention, the change-over operation between a free-run sweep operation and trigger sweep operator in a cathode ray oscilloscope is automatically performed in response to the existence or non-existence of an input trigger pulse.

This automatic change-over operation is hereinafter referred to as "automatic free-run sweep operation" in this specification and claims.

Accordingly, the principal object of this invention is to provide an oscilloscope in which when no trigger signal is applied to an input terminal of a sweep circuit a closed circuit including a sweep gate circuit, a sweep generator circuit and a hold-off circuit performs a self-excitation sweep operation to repeatedly produce sweep waves so as to produce a clear sweep trace on the face of the cathode-ray tube and when the trigger signal is applied to the input terminal the aforementioned sweep operation is automatically changed over and sweep waves synchronized with the trigger signal are produced, thus an automatic free run sweep operation is performed.

Another object of this invention is to provide an oscilloscope in which the sweep operation in the sweep gate circuit is stabilized by an external controlling standard or reference voltage.

A yet further object of this invention is to provide an oscilloscope in which even when the phase of an input trigger signal is inverted in a trigger amplifier circuit the trigger level does not change substantially.

Other object, features and advantages of this invention will become apparent from the following description taken in conjunction with the accompanying drawings in which:

FIGURE 1 is an electrical circuit diagram showing an embodiment of a trigger sweep circuit of this invention; and FIGURE 2 is a schematic diagram illustrating the electric potential relation of the main portion of the circuit shown in FIGURE 1.

Referring now to FIGURE 1, we will explain the point of parts surrounded by the chain lines. 10 is a trigger amplifier circuit provided with a switch circuit which selectively introduces either one of an internal trigger signal and external one thereto, another switch circuit which also selectively changes over the coupling system of alternating or direct current, another switch circuit which inverts the phase of an input trigger signal and a circuit which selects the trigger level to a predetermined value by changing direct current potential of an output signal. 20 is a trigger shaper circuit composed mainly of a Schmitt circuit consisting of two electron tubes, which trigger shaper produces a rectangular wave and pulse wave when a signal supplied from the aforementioned trigger amplifier circuit runs across a certain level. 30 is a sweep gate circuit composed mainly of a Schmitt circuit, which gate circuit is put into a set condition by the trigger input of a negative trigger signal applied from the aforesaid shaper circuit and put into a reset condition by a feedback voltage applied from a hold-off circuit hereinbelow described. Furthermore, in the sweep gate circuit is included an unblanking circuit which controls the trace brightness of a cathode-ray tube. 40 is a sweep voltage generator circuit which consists of an integration circuit of very good linearity called Miller integrator circuit and produces a positive linear rising wave by a negative step voltage applied from the sweep gate circuit. This linear rising wave becomes a sweep signal and its rising speed becomes a sweep speed, and said speed can be adjusted properly by a time constant of the integration circuit. 50 is a hold-off circuit which is provided with a voltage divider circuit performing voltage dividing of the aforementoned sweep signal and a hold-off time constant circuit, which hold-off circuit resets the sweep gate circuit when the sweep signal reaches a certain voltage level, thereby stopping the sweep. 60 is a reference voltage setting circuit and 70 is a trigger gate circuit. The trigger gate circuit 70 is composed mainly of a Schmitt circuit and applies a suitable direct current bias voltage to a trigger input circuit of the aforementioned sweep gate circuit 30. 80 is a rectifier circuit, which rectifies the output rectangular wave from the trigger shaper circuit 20 and feeds this rectifying output to the trigger gate circuit 70.

Then, we will hereinafter explain concretely the point of the structure and operation of the above circuits.

The trigger amplifier circuit 10 is provided with a differential amplifier circuit including electron tubes 11 and 12, a switch circuit provided for selecting an input trigger signal and inverting its phase and a trigger level setting circuit. The common connecting point of both cathodes of the electron tubes 11 and 12 is connected through a resistor 114 to a terminal 118 of negative potential (−150 v.) of a direct current power source (not shown in the drawing), and their plates are connected respectively through load resistors 115 and 116 to a terminal 117 of positive potential (+105 v.) of the direct current power source. The grid of the electron tube 11 is connected through a resistor 112 to a brush of the switch 107 and that of the electron tube 12 is to a brush of a switch 108 through a resistor 113. The change-over switch circuit includes switches 104, 105, 106, 107, 108 and 109. Moving contacts of the switches 104, 107 and 108 are ganged with one another. In accordance with the choice of using the positive slope or the negative slope of the trigger (+) (−), change-over operation is performed by the switch group. The switch groups will also select whether the signal given to the terminal 101 from the vertical axis voltage amplifier part is utilized or the external signal given to the terminal 102. Moving contacts of the switches 105 and 109 are also ganged with each other, changing over respective operations of the sweep such, for example, as single sweep (contact point S), trigger sweep (contact point T) and automatic self-excitation sweep (contact point A). The switch 106 is an A.C.-D.C. change-over switch. The — contact point of the switch 107 and + contact point of the switch 108 are electrically connected to each other and their common connection point is connected to an input terminal 101 or 102 through the circuits of the switches 106, 105 and 104. The trigger level selector circuit includes a variable voltage divider 125, both ends of which are connected through series resistors 126 and 127 respectively to a positive potential terminal 128 (+215 v.) and to a negative potential terminal 129 (−150 v.) and its brush connected to the ground through series circuits of resistors 122, 120 and 121. The common connection point of the resistors 120 and 122 is connected to the + contact point of the aforementioned switch 107 and to the ground through a capacitor 123 and the switch 109 (contact points S and T are dummy contact points). The common connection point of the resistors 120 and 121 is connected respectively to the — contact point of the aforesaid switch 108 and to the ground through a capacitor 124.

In the trigger amplifier circuit 10 connected as described above, when a trigger signal added to the input terminal 101 or 102 is of an alternating current it is applied through the switch 104, series condenser 110 and switch 106 to the grid of the electron tube 11 or 12, and when the signal is of a direct current it is through the switch 105. When the contact points of the switches 107 and 108 are in contact with contact points shown by + an input signal is applied to the grid of the right hand electron tube 12. An output signal produced from a lead line 13 of the plate circuit of the right hand electron tube 12 is reverse phase to the input signal. When the aforementioned two contact points 107 and 108 are placed respectively on contact points —, the input signal is applied to the grid of the left hand electron tube 11 and the aforesaid output is in-phase to the input. To the grid of either one of the electron tube 11 or 12 to which the signal is not applied is supplied a direct current voltage the amount of which can be adjusted from the voltage divider 125, and the direct current voltage serves to change the direct current level of the output of this circuit produced at the output terminal 13. The input signal corresponds to the direct current level and is amplified within a certain level range, and when it goes over the level range the electron tube 11 or 12 is cut off or saturated, limiting the output voltage to a certain value. Accordingly, if the input signal has an amplitude larger than a certain limit, the voltage produced at the output terminal 13 take the form analogous to a rectangular wave illustrated in the drawing. It must be noted that amounts of the direct current voltages applied to the respective grids of the electron tubes 11 and 12 from the trigger level selector circuit are made a little different from each other. The resistance value of the resistors 120 and 121 are so selected in advance as to satisfy the following formula.

$$\frac{\text{Resistance value of resistor 120}}{\text{Resistance value of resistor 121}} = \left(\frac{\text{Gain from grit of electron tube 12 to plate output circuit of electron tube 12}}{\text{Gain from grit of electron tube 11 to plate output circuit of electron tube 12}}\right)^2 - 1$$

As a result of this, the amplifier gain to the input signal to be applied to the grid of the electron tube 11 and that to the input signal to be applied to the grid of the electron tube 12 becomes of substantially the same value and the level of the input trigger signal to be triggered does not change even if changing over the polarities + and — of the switches 107 and 108 occurs. In such a trigger amplifier circuit heretofore employed, when inverting the phase of the input signal its amplifier gain varies according to the +, — changeover of the switches because the resistor 120 was not used and consequently the trigger level changes with operation of the switches. Therefore, the conventional circuit has a disadvantage in that, for example, the brush of the variable voltage divider 125 must be adjusted every time when the polarities + and — of the switches are changed over. According to this invention, by suitably selecting the resistance value of the resistors 120 and 121 as described above the trigger level does not change even when the polarities + and — of the switches are changed over.

The trigger shaper circuit 20 is composed of a Schmitt circuit including electron tubes 21 and 22. The cathode of the electron tube 22 is connected to the electron tube 21 through a parallel circuit composed of a capacitor 212 and a low resistor 213. The cathode of the other electron tube 21 is connected to the ground through a resistor 214. The plate of the electron tube 21 is connected through a load resistor 217 to a positive electric potential terminal 220 of a power source. A voltage of +215 v. is applied across the terminal 220 and the ground. The aforesaid plate is connected to the grid of the electron tube 22 through a parallel circuit composed of a resistor 210 and a capacitor 211 and the grid of the electron tube 22 is connected further to the ground through a series circuit of resistors 215 and 216. Furthermore, the plate of the electron tube 22 is connected to the aforementioned terminal 220 through a series circuit of load resistors 218 and 219. Respectively to both ends of the aforesaid load resistor 218 connected output lead lines 23 and 24, and an inductance coil 221 is inserted between the two lead lines 23 and 24. The grid of the electron tube 21 is connected to the lead line 13 of the trigger amplifier circuit 10 through the resistor 14. In the trigger shaper circuit 10 connected as described above, when the electron tube 21 becomes conductive at first and the other electron tube 22 is cut-off a trigger signal is applied to the grid of the electron tube 21 from the output lead line 13 of the amplifier circuit 10 through the resistor 14, thereby the grid voltage of the electron tube 21 becomes lower than a certain transition voltage and then electron tube 21 is reversed to cut-off and 22 conductive. Then, when the grid voltage of the electron tube 21 becomes higher than a certain transition voltage by the aforesaid trigger signal the electron tubes 21 and 22 return to their initial condition. Since the switching operation of the electron tubes 21 and 22 is a positive feedback operation, it is carried out very rapidly and rectangular wave signals of very sharp rising and falling edges are obtained in the output lead line 24 and their amplitudes are of a constant value (about 5 v.). Furthermore, in the other lead line 23 of the electron tube 22 are produced positive and negative pulse waves (their peak values are about 8 v.) by the differentiating operation of the inductance coil 221 at the rising and falling points of the aforementioned rectangular wave. In the aforesaid trigger shaper circuit it must be noted to utilize operation characteristics as a Schmitt circuit (or operation characteristics as a bistable multivibrator circuit).

The sweep gate circuit 30 consists of a Schmitt circuit including electron tubes 31, 32 and 33 and an unblanking circuit including an electron tube 34.

A cathode common connection point of the electron tubes 31 and 33 is connected to a terminal 318 through a resistor 316 and a switch 301 and a voltage of —150 v. to the ground is added thereto. The grid of the electron tube 31 is connected to the output lead line 23 of the trigger shaper circuit 20 described above through a series circuit of a diode 312 and a capacitor 311, and a series circuit of a diode 313 and a resistor 314 is connected across both the electrodes of the diode 312. The plate of the electron tube 31 is connected respectively to the grid of the electron tube 32 and to a terminal 334 through two resistors 321 and 322 and a voltage of +105 v. is impressed to this terminal 334. The cathode of the electron tube 32 is connected to the grid of an electron tube 33 through a parallel circuit of a resistor 325 and a capacitor 326, which grid is connected through a resistor 327 to a negative electric potential terminal 328, to which a voltage of —150 v. is impressed. The plate and screen grid of the electron tube 33 are connected respectively through resistors 331 and 332 to a terminal 333 to which a voltage of +105 v. is impressed. The cathode of the aforesaid electron tube 32 is connected respectively to a common connection point of the aforementioned resistors 321 and 322 through a capacitor 329 and to the ground through series resistors 336 and 337, and a capacitor 338 is connected in parallel to the resistor 336. A common connection point of the resistors 336 and 337 is connected to the grid of the electron tube 34 and its cathode is connected respectively to the ground through a resistor 339 and to an output terminal 342 of an unblanking signal. A plate output lead line 350 of the electron tube 33 is connected respectively to the respective plates of clamping diodes 35 and 36 and to the ground through a resistor 343 and through a series circuit of a resistor 344 and a capacitor 345. The respective plates of the electron tubes 32 and 34 are connected respectively to terminals 335 and 341, to which terminals a voltage of +215 v. is impressed.

In the sweep gate circuit formed as described above, the brief explanation will be given first and the detailed remarks about potential relation of the circuits will be given later. When the Schmitt circuit including the electron tubes 31 and 33 is at a standstill (the sweep operation is not carried out and this condition is referred to as a reset condition), the electron tube 31 becomes conductive and the other electron tube 33 is cut-off. In case of the grid transition voltage being −54.5 v., when the grid voltage is reduced lower than the aforesaid transition voltage (−54.5 v.) by a negative trigger pulse applied from the output lead line 23 to the grid of the electron tube 31 through the diode 312, the electron tube 31 becomes cut-off and its plate voltage rises. Consequently the grid potential of the electron tube 33 rises through the cathode follower of the electron tube 32, at the same time the cathode voltage $E_K$ of the electron tubes 31 and 33 falls temporarily and hence the electron tube 33 becomes conductive. Thus the electron tube 33 becomes conductive, when the cathode voltage $E_K$ rises again and the electron tube 31 becomes cut-off, and thereafter this condition is maintained. This condition is referred to as a set condition. The cathode follower circuit of the electron tube 32 serves to avoid the influence of the input capacitance of the electron tube 33 to obtain rapid transition operation and also serves to obtain an unblanking signal. As described above, when in the set condition, a negative step signal is produced in the output lead line 350 of the electron tube 33, thereby performing the sweep operation, and a positive step signal, namely unblanking signal, is produced at the output end 342 of the electron tube 34 simultaneously.

In order to return the set condition described above to the reset one, the grid voltage of the electron tube 31 must be increased up to about −33 v. This reset transition operation is carried out by feeding back the sweep output signal through the hold-off circuit 50 as described hereinafter.

As the sweep generator circuit 40, a circuit of good linearity known under the name of Miller integration circuit is used. That is, this circuit includes electron tubes 41 and 42 and a sweep time constant circuit 400. The cathode of the electron tube 41 is connected to the cathode of the aforementioned clamp diode 35 and the grid of the said electron tube 41 is connected to the plate of the electron tube 42 through a series circuit of a resistor 411 and a neon tube 414. To the series circuit of the resistor 411 and the neon tube 414 is connected a capacitor 412 in parallel thereto, and a common connection point of the resistor 411 and the neon tube 414 is connected a resistor 413 to a terminal 415, to which a voltage of −150 v. is impressed from the power source. The cathode and the grid of the electron tube 41 are connected through a neon tube 416 and its plate is connected directly to a terminal 419, to which a positive voltage of +310 v. is impressed. The plate of the electron tube 42 is connected through resistors 417 and 418 to the aforesaid terminal 419, and its grid is to the cathode of the clamp diode 36. The screen grid of the electron tube 42 is connected to a terminal 421 of positive potential of +105 v., to which a positive potential of +105 v. is impressed, and its cathode is connected to the ground. The cathode of the aforementioned electron tube 41 is connected to an output terminal 424 of a sweep signal and the sweep time constant circuit 400 is inserted between the said cathode and the grid of the electron tube 42. This time constant circuit 400 is formed in such a manner that a desired sweep time constant can be obtained by changing over capacitors represented as 425 and resistors represented as 426 by means of switches 401, 402 and 403. A direct current voltage of a certain value is applied through a variable voltage divider 427 to the time constant circuit 400. One end of the variable voltage divider 427 is connected through a resistor 428 to the ground and its other end is to a terminal 431 through a resistor 429, to which a voltage of −150 v. is impressed. In the sweep gate circuit formed as described above, when the sweep gate circuit 30 of the preceding stage is held reset, the plate voltage of the electron tube 33 has come to be a high voltage and hence the diodes 35 and 36 are both conductive. The diode 35 clamps the plate voltage of the electron tube 33, namely it indirectly clamps the grid voltage of the electron tube 42 and at that time the cathode voltage of the electron tube 41 is about −4 v. and the plate voltage of the electron tube 33 is about −3 v. On the other hand, a small amount of current flows to the diode 36 through the resistor 426 of the time constant circuit 400 and the grid voltage of the electron tube 42 is about −3.5 v., and the electron tube 42 functions as a class A amplifier circuit. Consequently the plate voltage of the electron tube 42 comes to be of a certain value, which plate voltage is reduced by the amount of voltage drop of the neon tube 414 and applied to the grid of the electron tube 41. Thus, the sweep gate circuit 30 is put into the set condition and when the electron tube 33 becomes conductive its plate voltage lowers down to about −10 v. and the diodes 35 and 36 become cut-off. As a result of this, the capacitor 425 of the time constant circuit 400 is charged through the resistor 426 and the grid voltage of the electron tube 42 falls a little. Due to this slight fall of the grid voltage, the plate voltage of the electron tube 42 rises greatly, by which voltage a charging current of a certain value flows to the capacitor 425 and the voltage across the both ends thereof rises linearly with the lapse of time. This rising voltage output is applied to a horizontal deflecting plate of a cathode-ray tube through a horizontal amplifier (not shown in the drawing) as a sweep signal from the terminal 424.

The hold-off circuit 50 includes electron tubes 51 and 52 and a time constant circuit 500. The grid of the electron tube 51 is connected to a brush of a variable voltage divider 512, one end of which voltage divider is connected through a resistor 511 to the cathode of the electron tube 41 of the sweep generator circuit described above, the other end thereof being connected through a resistor 513 to a negative electric potential terminal 514 (−150 v.). The cathode of the electron tube 51 is connected to the terminal 514 through a resistor 515 and to the grid of the electron tube 52 of the next stage through a resistor 516. Furthermore, the cathode of the electron tube 51 is connected to the ground through a switch 501 and a capacitor 517 of the aforesaid time constant circuit 500. Switches 501, 401, 402 and 403 are interlocked with one another and cooperate so that the hold-off time constant circuit 500 and the sweep time constant circuit may cooperate with each other. In the circuit formed as above described, a sweep signal led out of the sweep generator circuit 40 is voltage-divided by the variable voltage divider 512, thereafter being applied to the grid of the electron tube 51. Then the cathode follower output of the electron tube 51 is applied to the grid of the electron tube 52 of the next stage and integrated to the capacitor 517. At the start of the sweep signal the cathode voltage of the electron tube 52 is held cut-off by a direct current voltage applied from the trigger gate circuit 70 described hereinbelow but its grid voltage rises with the increase of the sweep signal output and when this grid voltage exceeds the cut-off voltage of the electron tube 52, the electron tube 52 becomes conductive to afford a feedback voltage to the grid of the electron tube 31 of the aforementioned sweep gate circuit 30. When the grid voltage of the electron tube 31 goes over —33 v. by the feedback voltage the gate circuit 30 is put into the reset condition to stop the sweep operation.

The reference voltage setting circuit 60 is composed of a cathode follower circuit of an electron tube 61. The grid of the electron tube 61 is connected through a resistor 611 to a capacitor 615 and a brush of a variable voltage divider, the other terminal of the capacitor 615 is connected to the ground. One terminal of the variable voltage divider is connected through a resistor 613 to a positive electric potential terminal 618, to which terminal a voltage of +105 v. is impressed, and the other terminal thereof is connected through a resistor 614 to a terminal 619, to which a voltage of —150 v. is impressed. The plate of the electron tube 61 is connected directly to the ground and its cathode is connected to the terminal 619 through a variable voltage divider 616 and a resistor 617. Thus, a reference voltage $E_s$ (about —53 v.) is obtained from the electron tube 61, which voltage $E_s$ is supplied through the diode 315 to the cathodes of both the electron tubes 31 and 33 of the aforementioned sweep gate circuit. From a brush of the variable voltage divider 616 is obtained a reference voltage $E_s'$ (about —58 v.), which is applied to the rectifier circuit 80. These reference voltages $E_s$ and $E_s'$ are further supplied to the trigger gate circuit 70. The above mentioned reference voltage selector circuit 60 is a circuit for obtaining the voltage sources $E_s$ and $E_s'$ of sufficiently low internal impedance and hence it can be replaced by other suitable power source device.

The trigger gate circuit 70 consists mainly of a Schmitt circuit including electron tubes 71 and 72. The grid of the electron tube 71 is connected to the reference voltage setting circuit 60 through a parallel circuit of a resistor 711 and a diode 712 and through switches 703 and 701. The switch 701 is interlocked with a switch 702 hereinbelow mentioned and also interlocked with the switches 105 and 109 of the trigger amplifier circuit 10, changing over the kind of sweeps. S and T contact points of the switch 701 are both connected to the cathode of the electron tube 61 and A contact point is connected to the rectifier circuit 80. The switch 703 is interlocked with a switch 704 hereinbelow described, both of which are provided respectively with a normal operating contact point N and with a C contact point of zero check. The N contact point of the switch 703 is connected to the switch 701 and the C contact point is to a brush of the variable voltage divider 616 of the electron tube 61. The grid of the electron tube 71 is connected to the ground through a series circuit of a capacitor 713 and a resistor 714, to which capacitor 713 a switch 705 for resetting in case of the single sweep is connected in parallel, and to which resistor 714 and a capacitor 715 is connected in parallel. A common connection point of the cathodes of the electron tubes 71 and 72 is connected respectively to the cathode of the electron tube 52 of the hold-off circuit 50 and to the grid of the electron tube 31 through the resistor 314 of the sweep gate circuit 30, and the cathode common connection point and the grid of the electron tube 72 are connected to a negative electric potential terminal 724 (—150 v.) respectively through resistors 722 and 723. The plate and the screen grid of the electron tube 71 are connected in common, which connection point is connected respectively to the grid of the electron tube 72 through a parallel circuit of a resistor 716 and a capacitor 717 and to a positive electric potential terminal 721 (+105 v.) through a resistor 718. The plate of the electron tube 72 is connected to the terminal 721 through a resistor 719, switches 702 and 704. T and A contact points of the switch 702 and C contact point of the switch 704 are dummy contact points. The plate of the electron tube 72 is connected to the ground through resistors 725 and neon tubes 726.

In the trigger gate circuit 70 connected as above explained, when the switches 702 and 704 inserted in the plate circuit of the electron tube 72 are in contact respectively with the T, A or C contact points the electron tube 72 is held cut-off. Accordingly, when the switches 701 to 704 are in contact respectively with contact points as shown in the drawing, namely while in a trigger sweep operation, a voltage $E_s$ of —53 v. is applied from the reference voltage selector circuit 60 to the grid of the electron tube 71, by which a voltage of about —51 v. is sent out into a lead line 74 from the cathode of the electron tube 71, which voltage is higher than a transition voltage of about —54.5 v. of the electron tube 31 of the sweep gate circuit 30. As a result of this, the sweep operation is carried out by a negative trigger pulse applied to the input terminal of the sweep gate circuit 30. When the switches 703 and 704 are placed onto the zero-check contact point C (at this time the input terminal of the vertical amplifier circuit is short-circuited simultaneously), a voltage $E_s$ of —58 v. which is lower than the voltage $E_s$ is applied to the grid of the electron tube 71, thereby the cathode voltage of the electron tube 71 goes down to about —56 v. Therefore, a grid bias voltage of the electron tube 31 of the sweep gate circuit 30 also falls lower than the aforementioned transition voltage $E_{h1}$ and hence free-run sweep operation is performed and zero trace appears on the screen of the cathode-ray tube. When the switches 703 and 704 are on the side of the N contact point and the switches 701 and 702 are on the side of the A contact point (namely, while in automatic free-run sweep operation as hereinbefore mentioned), two operations are considered; one is the case of a rectifying output being supplied from the rectifier circuit 80 and the other is the case of no such output being supplied. In the former case a voltage nearly equal to the aforesaid voltage $E_s$ is applied to the grid of the electron tube 71, performing the operation same as the trigger sweep operation explained above, and in the latter one the voltage same as the voltage $E_s'$ is added to the grid of the electron tube 71 to carry out the free-run sweep operation identical to the aforementioned zero-check operation. When the switches 701 and 702 are on the side of the S contact point and the switches 703 and 704 are on the side of the N contact point (namely, while in the single sweep operation), the circuit including the electron tubes 71 and 72 operates as a Schmitt circuit. That is, at first the electron tube 71 becomes conductive and the other one 72 is cut-off, when the cathode voltage is held to about —51 v. as previously described. At this time, the sweep gate circuit 30 is operated by one trigger pulse to be put into a set condition, consequently when an output voltage of the hold-off circuit 50 rises the cathode voltages of the electron tubes 71 and 72 also rise and the electron tube 71 becomes cut-off and the other one 72 conductive and its cathode voltage becomes about —40 v. The cathode voltage of —40 v. acts on the grid bias voltage of the electron tube 31 and hence even if a negative trigger pulse the peak value of which is 8 v. is applied to the input terminal of the electron tube 31, the sweep gate circuit 30 does not return to the set condition. In this case, when the electron tubes 71 and 72 are reset to their initial state the switch 705 is closed. Upon the closure of the switch 705 the grid voltage of the electron tube 71 sharply rises from —53 v. to zero potential and the electron tube 71 becomes conductive and the other one 72 cut-off. At this time the neon tubes 726 connected to the plate circuit of the electron tube 72 are lighted, thereby indicating that the trigger gate circuit 70 is reset. The diode 712 serves to eliminate the influence of a negative pulse produced on the side of the grid of the electron tube 71 and the capacitor 713 serves to prevent sparks of the contacts of the switch 705.

The rectifier circuit 80 is composed of a peak-to-peak voltage rectifier circuit including diodes 812 and 813, in which an electrode connected to the diodes 812 and 813 in common is connected to the output lead line 24 of the trigger shaper circuit 20 through a direct current blocking capacitor 811. Between the other electrodes of the diodes 812 and 813 is connected a parallel circuit of a filtering resistor 814 and a capacitor 815. One terminal of the filtering circuit is connected to the ground through capacitor 816 and to a brush of the variable voltage divider in the reference voltage setting circuit. The other terminal of the filter circuit is connected to the contact A of the switch 701 of the trigger gate circuit 70. The rectifier circuit 80 formed as described above is adjusted in such a way that when a rectangular wave voltage is supplied from the output lead line 24 of the trigger shaper circuit 20 it may be rectified and a direct current voltage $\Delta E$ may be obtained irrespective of its pulse width and repeating frequency.

In the foregoing descriptions the respective circuits of this invention have been set forth in general and additional points are as follows.

In the sweep gate circuit 30 the reference voltage $E_s$ is supplied through the diode 315 to both the cathodes of the electron tubes 31 and 33 forming the Schmitt circuit, by which the grid transition voltage of the electron tube 31 in the Schmitt circuit is much stabilized and does not change even if the electron tube characteristics change with the lapse of time. Now we will hereinbelow explain its reason with reference to the potential diagram of FIGURE 2. For the sake of simplicity, we will described the case of performing the so-called trigger sweep operation with the contact points of the switches 701 to 704 as shown in FIGURE 1. Now it is presupposed that a grid voltage (referred to as a first transition voltage) is $E_{h1}$ which cuts off the electron tube 31 when the electron tube 31 has been conductive and the electron tube 33 cut-off and the said voltage $E_{h1}$ is $-54.5$ v., and that a grid voltage (referred to as a second transition voltage) is $E_{h2}$ which makes the electron tube 31 conductive when the electron tube 31 has been cut-off and the electron tube 33 conductive and the said voltage $E_{h2}$ is $-33$ v. Then, assuming that the reference voltage $E_s$ is applied to the grid of the electron tube 71 in the trigger gate circuit 70 and its cathode voltage is set $-51$ v. This cathode voltage is supplied through the lead line 74 to the grid of the electron tube 31 as a direct current bias voltage $E_g$. Since this grid voltage $E_g$ ($-51$ v.) is higher than the first transition voltage $E_{h1}$, the electron tube 31 is conductive and the electron tube 33 cut-off. It is supposed that the output from the hold-off circuit 50 is zero, namely the electron tube 52 is cut-off in this case. The cathode voltage $E_K$ of the electron tube 31 is a little more positive or about $-50$ v. than the grid voltage $E_g$ of $-51$ v. Consequently the electric potential of the anode of the diode 315 is lower than that of the cathode and this diode 315 does not become conductive, so that the reference voltage $E_s$ does not affect the both cathodes of the electron tubes 31 and 33. Then when a negative pulse the peak value of which is about 8 v. is supplied from the lead line 23 to the grid of the electron tube 31, the gride voltage $E_g$ of the electron tube 31 falls and its cathode voltage $E_K$ also lowers correspondingly. At this time, when the cathode voltage $E_K$ becomes a negative potential with respect to the reference voltage $E_s$ the diode 315 becomes conductive and the cathode voltage $E_K$ is clamped to the reference voltage $E_s$. On the other hand, the grid voltage $E_g$ falls by the amount of the peak value of the aforementioned pulse. As soon as the grid voltage $E_g$ reaches the first transition voltage $E_{h1}$ and exceeds it, the electron tubes 31 and 33 are reproducingly transferred to the set condition and the cathode voltage $E_K$ rises instantaneously. Then, the sweep gate circuit 30 is put into the set condition and a sweep signal is sent out of the sweep generator circuit 40 and when this sweep signal is fed back to the grid of the electron tube 31 through the hold-off circuit 50, the grid voltage $E_g$ rises linearly with the lapse of time. When this grid rising voltage goes up to the second transition voltage $E_{h2}$ the electron tube 31 becomes conductive and the electron tube 33 cut-off, resetting the circuit 30. The electric potential relations shown in FIGURE 2 are as follows:

$$E_{h1} < E_s < E_{h2} \quad (1)$$

$$E_{h1} \doteq E_s - e_{g31} \quad (2)$$

$$E_g' \doteq E_s + e_{g71} \quad (3)$$

where $E_g'$ is an initial grid voltage of the electron tube 31, $e_{g31}$ a bias voltage across the grid and the cathode of the electron tube 31 and $e_{g71}$ a bias voltage across the grid and the cathode of the electron tube 71. Since the voltage $e_{g31}$ and $e_{g71}$ are lower than about 2 v. and this is a sufficiently small value with respect to the reference voltage $E_s$, the variation of $E_{h1}$ and $E_g'$ become very small even though the electron tubes 71, 31 and 33 change with the lapse of time or by their replacement. Therefore, the voltages $E_{h1}$ and $E_g'$ are set primarily by the reference voltage $E_s$. Moreover, the value of $(E_g' - E_{h1})$ is not concerned with the voltage $E_s$ as apparent from the Formulate 2 and 3. Accordingly, whenever the peak value of a negative pulse applied to the grid of the electron tube 31 is larger than the value of $(E_g' - E_{h1})$, a trigger sweep is accomplished stably. As apparent from the foregoing explanation, if an internal impedance of the power source is very small, desired objects can be obtained with this reference voltage $E_s$ even though its voltage is somewhat fluctuated. It is one of the greatest characteristics of the device of this invention to set the cathode voltage of the electron tubes 31 and 33 by the use of the diode 315 and the external reference voltage $E_s$ as above described.

In a device of this kind heretofore used, no diode and reference voltage source are provided and hence the transition voltage of the Schmitt circuit is directly affected by the variation of a power source voltage particularly by the replacement and change with the lapse of time of the electron tubes. Therefore a stable trigger sweep is very difficult to perform, unless a stability circuit using a variable voltage divider is added to the trigger gate circuit and the bias voltage applied to the sweep gate circuit is adjusted by this stability circuit in accordance with the change of characteristics of the electron tubes. According to this invention, all these defects can be eliminated.

In the sweep gate circuit 30 wherein the resistor 316 and the switch 301 are inserted between the cathodes of the electron tubes 31 and 33 and the negative potential terminal 318, the switch 301 is put in contact with the side of INT in case of an internal sweep, and the switch 301 is set in contact with that of EXT and a high resistor 317 is added in case of an external sweep. If now the switch 301 is put in contact with the EXT contact point, the cathode resistance has a series composite value of the resistors 316 and 317, which composite value becomes very large. Consequently the electron tubes 31 and 33 become both cut-off and the sweep operation ceases. At this time, an unblanking signal of high voltage is supplied from the output terminal 342 to the first grid of the cathode-ray tube (not shown in the drawing). When the electron tubes 31 and 33 are held cut-off their cathode is held at a little positive electric potential and hence a large inverse voltage is impressed across the electrodes of the diode 315. Then, by properly selecting the resistance value of the resistor 317 the amount of the inverse voltage can be adjusted as desired.

The second main point of this invention is such that in case of no trigger signal being supplied to the input terminal 101 or 102 a closed circuit including the sweep gate circuit 30, the sweep generator circuit 40 and the hold-off circuit 50 automatically performs a free-run sweep operation. This operation is the same as that of the case in which the switches 701 and 702 are in contact with the A contact and the switches 703 and 704 are with the N contact point in the trigger gate circuit 70. Now we will additionally explain the operations of the whole circuits. In the trigger amplifier 10 the switches 105 and 109 are interlocked with the switches 701 and 702 and in contact with the side of the A contact point, accordingly the grid voltage of the electron tube 11 or 12 is set to zero potential. That is, the trigger level is zero potential in this case. In case of no trigger signal being supplied to the input terminals 101 and 102 no rectangular wave signal is led out into the output lead line 24 of the trigger shaper circuit 20. Accordingly since the shaping output $\Delta E$ of the shaper circuit 80 is zero, to the grid of the electron tube 71 is applied a voltage which is equal to the voltage $E_s'$ of $-58$ v. applied by the variable voltage divided 616 of the reference voltage setting circuit 60. Thus the cathode voltage of the electron tube 71 is set to about $-56$ v. As the cathode voltage of $-56$ v. is lower than the first transition voltage $E_{h1}$ of $-54.5$ v., the electron tube 31 is cut off and the other electron tube 33 made conductive, putting the sweep gate circuit into the set condition. Then, when a feedback voltage of a sweep output is added to the grid of the electron tube 31 through the hold-off circuit 50 and its grid voltage goes up to the second transition voltage $E_{h2}$, the electron tube 31 becomes conductive and the electron tube 33 cut-off. As a result of this, the feedback voltage reduces and the grid voltage of the electron tube 31 gradually goes down to the cathode voltage $-56$ v. of the electron tube 71 again. Meanwhile, when the grid voltage reaches the first transition voltage $E_{h1}$ the sweep gate circuit 30 is put into the set condition again and thereafter free-run sweep operation is carried out by the closed circuit of the circuits 30, 40 and 50. In accordance with this free-run sweep operation an unblanking signal is sent out from the terminal 342. Furthermore, the direct current average value of the unblanking signal is substantially constant irrespective of the sweep speed determined by the sweep time constant circuit 400, so brightness of a bright spot of the cathode-ray tube controlled by the unblanking signal is also substantially constant independently of the sweep speed. That is, according to this invention, even when no trigger signal is applied to the input terminal a clear trace of the bright spot is obtained on the cathode-ray tube. In the above operation, when a trigger signal is impressed to the input terminal 101 or 102 a rectangular wave signal is sent out from the output lead line 24 of the trigger shaper circuit 20 by the trigger signal and positive and negative pulses are also sent out from the output lead line 23 as previously described. The rectangular wave signal supplied from the lead line 24 to the shaper circuit 80 produces the rectifying output $\Delta E$ the peak-to-peak voltage of which is rectified by the said circuit 80. At this time, if the resistance value of the resistors 219 of the electron tube 22 in the trigger shaper circuit 20 is selected beforehand in such a way that the sum of the reference voltage $E_s'$ and the rectifying output $\Delta E$ becomes the reference voltage $E_s$ a voltage substantially equal to $E_s$ is supplied to the grid of the electron tube 71 of the trigger gate circuit 70, consequently the sweep gate circuit 30, the sweep generator circuit 40 and the hold-off circuit 50 perform a normal sweep operation in accordance with an input trigger signal.

In short, when the switches 701 and 702 are in contact with the side of the A contact the device of this invention is automatically changed over to the trigger sweep operation or to the free-run sweep operation depending upon whether the input trigger signal is applied or not. In this kind of device heretofore used, the trigger shaper circuit 20 is composed of an astable multivibrator circuit and when a trigger signal is impressed to the input terminal of that circuit a repeating pulse wave of a frequency controlled by the trigger signal is produced, and when no such trigger signal is applied a pulse wave of a frequency determined by the circuit constant of the multivibrator. In either case, however, it is by the output of the astable multivibrator circuit that the sweep gate circuit is put into the set condition and it is by the feedback voltage of the sweep output to reset the sweep gate circuit. Therefore, when the repeating period of the output pulse of the astable multivibrator circuit is very longer as compared with a sweep output generating period suitably determined by the time constant circuit of the sweep generator circuit, the duration of time during which the sweep gate circuit is held set is very shorter than that of its reset condition and an average direct current voltage of the unblanking signal from the output terminal 342 becomes also very small. Therefore, the sweep trace on the cathode-ray tube becomes vague or does not appear. All these disadvantages can be eliminated in this invention.

We have hereinabove described and pointed out novel fundamental characteristics of this invention with reference to the respective circuits but it will be apparent that many modifications and variations may be effected without departing from the scope of novel concepts of this invention.

What is claimed is:

1. A trigger sweep circuit for a cathode-ray oscilloscope comprising
   (a) a trigger amplifier circuit disposed for connection to an input signal,
   (b) a trigger shaper circuit connected to an output of said trigger amplifier circuit and having a pulse signal output,
   (c) a sweep gate circuit having first and second inputs with said first input connected to said pulse signal output,
   (d) a sweep generator circuit connected to an output of said sweep gate circuit and having a sweep wave output,
   (e) a hold-off circuit connected between said sweep wave output and said first input of said sweep gate circuit,
   (f) a reference voltage setting circuit having first and second outputs with said first output connected to said second input of said sweep gate circuit, and
   (g) a trigger gate circuit connected between said second output of said reference voltage setting circuit and said first input of said sweep gate circuit.

2. A trigger sweep circuit as defined in claim 1 wherein said trigger amplifier circuit includes
   (a) a differential amplifier circuit,
   (b) means for selecting the phase of an output of said differential amplifier circuit, and
   (c) means controlling said differential amplifier circuit in response to the phase of the trigger input signal.

3. A trigger sweep circuit as defined in claim 1 wherein said sweep gate circuit includes
   (a) a Schmitt trigger circuit having a pair of electron tubes with respective cathodes constituting said second input of said sweep gate circuit, and
   (b) a diode, said first output of said reference voltage setting circuit being connected to said second input of said sweep gate circuit through said diode connected between said reference voltage setting circuit and said cathodes.

4. A trigger sweep circuit as defined in claim 1 including a rectifier circuit, said trigger shaper circuit having an output including a rectangular wave signal connected to said rectifier circuit, said trigger gate circuit including
   (a) a switch circuit for selectively changing between respective operations of a single sweep, a trigger sweep, and an automatic free-run sweep,
   (b) a Schmitt trigger circuit, and
   (c) means for adding an output of said reference voltage setting circuit and an output of said rectifier circuit, said switch circuit connecting an output of said adding means to said Schmitt trigger circuit during selection of the automatic free-run sweep operation whereby automatic free-run operation is performed during zero input to said trigger amplifier circuit and trigger sweep operation is performed during application of the trigger input signal to said trigger amplifier circuit.

5. A trigger sweep circuit as defined in claim 1 wherein said trigger shaper includes a rectangular wave output and including peak-to-peak rectifier means for rectifying said rectangular wave output to obtain an output of constant value irrespective of the pulse width and frequency of said rectangular wave output, said trigger gate circuit being selectively responsive to an output of said rectifier circuit and an output of said reference voltage setting circuit.

6. A trigger sweep circuit of a cathode-ray oscilloscope comprising
  (a) a trigger amplifier circuit including output phase selection means and trigger level selection means for providing a predetermined amplitude and phase of an output signal,
  (b) a trigger shaper circuit connected to the output of said trigger amplifier circuit and having an output including a rectangular wave signal and a pulse signal of constant peak values,
  (c) a sweep gate circuit connected to said pulse signal output and including clamping diodes and unblanking signal output means, said clamping diodes being non-conductive in response to said pulse signal,
  (d) a sweep generator circuit connected to said clamping diodes and having a sweep wave output,
  (e) a hold-off circuit connected between said sweep wave output and an input of said sweep gate circuit,
  (f) a rectifier circuit connected to said rectangular wave signal,
  (g) a reference voltage setting circuit, and
  (h) a trigger gate circuit selectively responsive to an output of said rectifier circuit and an output of said reference voltage setting circuit and having an output therefrom connected to the input of said sweep gate circuit.

7. A trigger sweep circuit as defined in claim 6 wherein said sweep gate circuit includes
  (a) a Schmitt trigger circuit having a pair of electron tubes with respective cathodes,
  (b) a diode connected between said reference voltage setting circuit and said cathodes, and
  (c) a resistance connected between said cathodes and a source of voltage during an external sweep input.

8. A trigger sweep circuit as defined in claim 6 wherein said trigger gate circuit includes
  (a) a switch circuit for selectively changing between respective operations of a single sweep, a trigger sweep, and an automatic free-run sweep,
  (b) a Schmitt trigger circuit, and
  (c) means for adding an output of said reference voltage setting circuit and an output of said rectifier circuit, said switch circuit disposed for connecting an output of said adding means to said Schmitt trigger circuit during selection of the automatic free-run sweep operation whereby automatic free-run operation is performed during zero input to said trigger amplifier circuit and trigger sweep operation is performed during application of the trigger input signal to said trigger amplifier circuit.

9. A trigger sweep circuit as defined in claim 6 wherein said rectifier circuit includes a peak-to-peak rectifier means for rectifying said rectangular wave signal to obtain an output of constant value irrespective of the pulse width and repeating frequency of said rectangular wave signal.

References Cited by the Examiner
UNITED STATES PATENTS
2,924,712   2/1960   Edens _____ 307—88.5

OTHER REFERENCES

Rider et al.: Encyclopedia on Cathode-Ray Oscilloscopes and Their Uses, 2nd edition, 1959. Relied on: pages 23–26, 27 (Fig. 23–5A), schematic of Du Mont 327; pages 23–105 (Fig. 23–30A) sweep gen., Hewlett-Packard 150A; pages 23–184, 185 (Fig. 23–66 D&E) time base gen., Tektronix 316.

JOHN W. HUCKERT, *Primary Examiner.*

DAVID J. GALVIN, *Examiner.*